(12) United States Patent
Ikeda et al.

(10) Patent No.: US 10,010,899 B2
(45) Date of Patent: Jul. 3, 2018

(54) WET POWDER MANUFACTURING APPARATUS AND WET POWDER MANUFACTURING METHOD

(71) Applicant: TOYOTA JIDOSHA KABUSHIKI KAISHA, Toyota-shi, Aichi-ken (JP)

(72) Inventors: Takenori Ikeda, Toyota (JP); Takeyuki Ozaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/401,296

(22) Filed: Jan. 9, 2017

(65) Prior Publication Data

US 2017/0209887 A1 Jul. 27, 2017

(30) Foreign Application Priority Data

Jan. 22, 2016 (JP) ................. 2016-010910

(51) Int. Cl.
*B05B 13/02* (2006.01)
*B05D 1/02* (2006.01)
(Continued)

(52) U.S. Cl.
CPC .......... *B05B 13/0257* (2013.01); *B05B 7/144* (2013.01); *B05B 7/1422* (2013.01);
(Continued)

(58) Field of Classification Search
CPC ... B05B 13/0257; B05B 7/1445; B05B 7/144; B05B 7/1422; B05B 12/12; B05D 3/12; B05D 1/26; B05D 5/12; B05D 1/02; B01F 7/02; B01F 3/12; B01F 7/022; B01J 2/10; B01J 2/12; B01J 2/18; H01M 4/04; H01M 4/139; H01M 4/08; H01M 4/0414;
(Continued)

(56) References Cited

U.S. PATENT DOCUMENTS 3,853,713 A * 12/1974 Colclough ................ C12C 1/02
   34/130
4,686,115 A * 8/1987 Majer ........................ B01J 2/12
   118/19
(Continued)

FOREIGN PATENT DOCUMENTS

JP   10-216575 A    8/1998
JP   2003-112027 A  4/2003
JP   2006-105439 A  4/2006

*Primary Examiner* — Laura Edwards
(74) *Attorney, Agent, or Firm* — Sughrue Mion, PLLC

(57) ABSTRACT

A wet powder manufacturing apparatus includes a housing being arranged such that a central axis CL of the cylindrical inner surface extends in a substantially horizontal direction, a plurality of stirring blades provided rotatably about the central axis CL, a rotary plate configured to rotate the stirring blades about the central axis CL such that the wet powder accumulated at the bottom of the cylindrical inner surface is scooped by the stirring blades and then dropped, a driving device configured to impart a rotary force to the rotary plate, a liquid diffusing device configured to diffuse liquid into the drum inner space so as to wet the powder, and a controller configured to control operations of the driving device and the liquid diffusing device. The controller includes control for vibrating the stirring blades.

7 Claims, 8 Drawing Sheets

(51) Int. Cl.
*B05B 12/12* (2006.01)
*B05C 3/08* (2006.01)
*B05B 7/14* (2006.01)
*B01F 7/02* (2006.01)
*H01M 4/04* (2006.01)
*B01F 3/12* (2006.01)
*H01M 4/139* (2010.01)
*H01M 4/08* (2006.01)

(52) U.S. Cl.
CPC ............ *B05B 7/1445* (2013.01); *B05B 12/12* (2013.01); *B05C 3/08* (2013.01); *B05D 1/02* (2013.01); *B01F 3/12* (2013.01); *B01F 7/02* (2013.01); *B01F 7/022* (2013.01); *H01M 4/0416* (2013.01); *H01M 4/0419* (2013.01); *H01M 4/08* (2013.01); *H01M 4/139* (2013.01)

(58) Field of Classification Search
CPC ..... H01M 4/0416; H01M 4/0419; B05C 3/05; B05C 3/08; A23G 3/26
USPC .... 118/303, 304, 417, 418, 19, 22; 427/435, 427/436
See application file for complete search history.

(56) References Cited

U.S. PATENT DOCUMENTS

2008/0283085 A1* 11/2008 Huntsman ................ B08B 7/02
 134/1
2012/0015101 A1* 1/2012 O'Hara ................ A23G 3/0095
 427/212

* cited by examiner

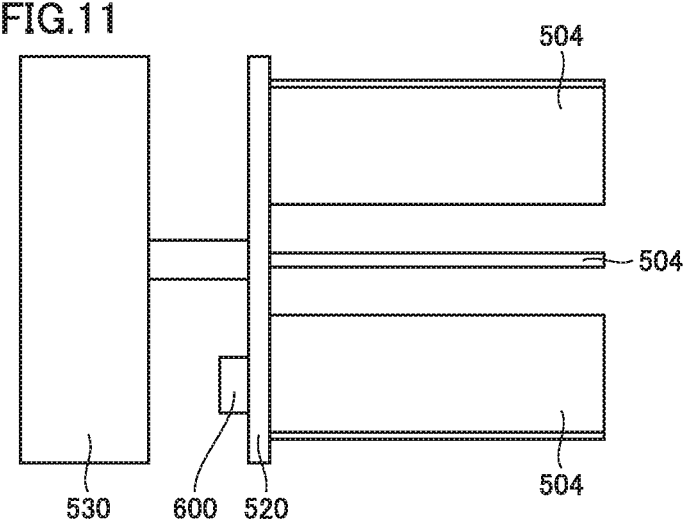
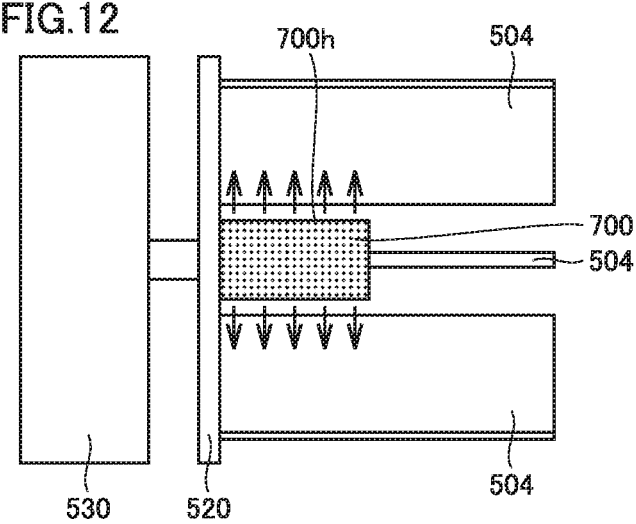

WET POWDER MANUFACTURING APPARATUS AND WET POWDER MANUFACTURING METHOD

This nonprovisional application is based on Japanese Patent Application No. 2016-010910 filed on Jan. 22, 2016 with the Japan Patent Office, the entire contents of which are hereby incorporated by reference.

BACKGROUND OF THE INVENTION

Field of the Invention

The present invention relates to a wet powder manufacturing apparatus and a wet powder manufacturing method for manufacturing wet powder.

Description of the Background Art

A coating step is used when forming a thin layer on a solid, such as a thin plate. In the coating step, the solid is coated with fluid (paste or slurry) obtained by kneading powder which is a raw material of the thin layer with liquid. Then, a drying step is carried out to remove the liquid to form a layer of aggregation of powder on the solid. The above-described steps are used for manufacturing an electrode plate of a secondary battery, for example.

Since the drying step is very burdensome, it has been tried recently to use wet powder with a smaller mixing ratio of liquid than in the above-described fluid. Japanese Patent Laying-Open No. 10-216575 discloses a method for manufacturing such wet powder with a smaller mixing ratio of liquid.

Japanese Patent Laying-Open No. 10-216575 discloses a technique for spraying slurry having a solid content and a solvent in a chamber to obtain granulated powder with the solvent removed therefrom. The granulated powder thus obtained is considered to correspond to the above-described wet powder because of its low content of a liquid component.

SUMMARY OF THE INVENTION

As a method for manufacturing wet powder, it is conceivable to use a drum-like container with the central axis arranged substantially horizontally, and to lift wet powder by stirring blades while rotating the stirring blades about the central axis along the inner circumferential surface of this drum container, then to spray liquid onto the wet powder when dropping the wet powder from the stirring blades to grow up the wet powder gradually to obtain wet powder having a desired mixing ratio of liquid. However, this method raises a concern about a problem that the wet powder adheres to the stirring blades.

The present invention was made in view of the above-described problem, and has an object to provide a wet powder manufacturing apparatus and a wet powder manufacturing method capable of preventing wet powder from adhering to stirring blades.

A wet powder manufacturing apparatus according to an aspect is a wet powder manufacturing apparatus for manufacturing wet powder while wetting powder. The wet powder manufacturing apparatus includes a housing having a cylindrical inner surface defining a cylindrical drum inner space, the housing being arranged such that a central axis of the cylindrical inner surface extends in a substantially horizontal direction, a plurality of stirring blades arranged to extend in the direction of the central axis along the cylindrical inner surface and provided rotatably about the central axis, a rotary plate configured to support each of the plurality of stirring blades at one end and to rotate the stirring blades about the central axis such that the wet powder accumulated at the bottom of the cylindrical inner surface is scooped by the stirring blades and then dropped, a driving device configured to impart a rotary force to the rotary plate, a liquid diffusing device configured to diffuse liquid into the drum inner space so as to wet the powder, and a controller configured to control operations of the driving device and the liquid diffusing device. The controller includes control for vibrating the stirring blades.

According to this wet powder manufacturing apparatus, the wet powder is separated from the stirring blades by applying vibrations to the stirring blades. As a result, the wet powder can be easily dropped from the stirring blades with the rotation of the stirring blades.

A wet powder manufacturing apparatus according to another aspect is a wet powder manufacturing apparatus for manufacturing wet powder while wetting powder. The wet powder manufacturing apparatus includes a housing having a cylindrical inner surface defining a cylindrical drum inner space, the housing being arranged such that a central axis of the cylindrical inner surface extends in a substantially horizontal direction, a plurality of stirring blades arranged to extend in the direction of the central axis along the cylindrical inner surface and provided rotatably about the central axis, a rotary plate configured to support each of the plurality of stirring blades at one end and to rotate the stirring blades about the central axis such that the wet powder accumulated at the bottom of the cylindrical inner surface is scooped by the stirring blades and then dropped, a driving device configured to impart a rotary force to the rotary plate, a liquid diffusing device configured to diffuse liquid into the drum inner space so as to wet the powder, and a controller configured to control operations of the driving device and the liquid diffusing device. The controller causes the driving device to reduce the rotating speed of the rotary plate at an angle at which the wet powder is dropped from the stirring blades.

According to this wet powder manufacturing apparatus, the wet powder can be separated from the stirring blades utilizing an inertia force when decreasing the rotating speed of the rotary plate. As a result, the wet powder can be easily dropped from the stirring blades.

Preferably, the controller accelerates the rotary plate after reducing the rotating speed of the rotary plate.

In this way, the wet powder can also be separated from the stirring blades utilizing an inertia force when increasing the rotating speed of the rotary plate. As a result, the wet powder can be easily dropped from the stirring blades.

According to another form of the above-described wet powder manufacturing apparatus, the controller causes the driving device to rotate the rotary plate in an opposite rotation direction when at least any one of the stirring blades reaches at least the top of the rotated position.

By this control, the stirring blades can also be vibrated, and the wee powder adhering to the stirring blades can be separated and dropped from the stirring blades.

According to another form of the above-described wet powder manufacturing apparatus, the rotary plate is provided with a vibration applicator, and the controller drives the vibration applicator.

By using the vibration applicator in this manner, the stirring blades can be vibrated, so that the wet powder adhering to the stirring blades can be separated and dropped from the stirring blades.

The wet powder manufacturing method is a wet powder manufacturing method for manufacturing wet powder using the above-described wet powder manufacturing apparatus. The wet powder as desired is manufactured by repeating a step of rotating the stirring blades about the central axis to scoop up the wet powder accumulated at the bottom of the cylindrical inner surface, then dropping the wet powder from the stirring blades, and diffusing the liquid onto the dropping wet powder using the liquid diffusing device to wet the wet powder.

According to the above-described wet powder manufacturing method, the wet powder is separated from the stirring blades with the rotation of the stirring blades, so that the wet powder can be easily dropped from the stirring blades.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 illustrates a vibration applicator provided for a rotary plate according to Example 5.

FIG. 12 illustrates a structure of a liquid feeding device of a wet powder manufacturing apparatus according to another embodiment.

DESCRIPTION OF THE PREFERRED EMBODIMENTS

Figure 1:
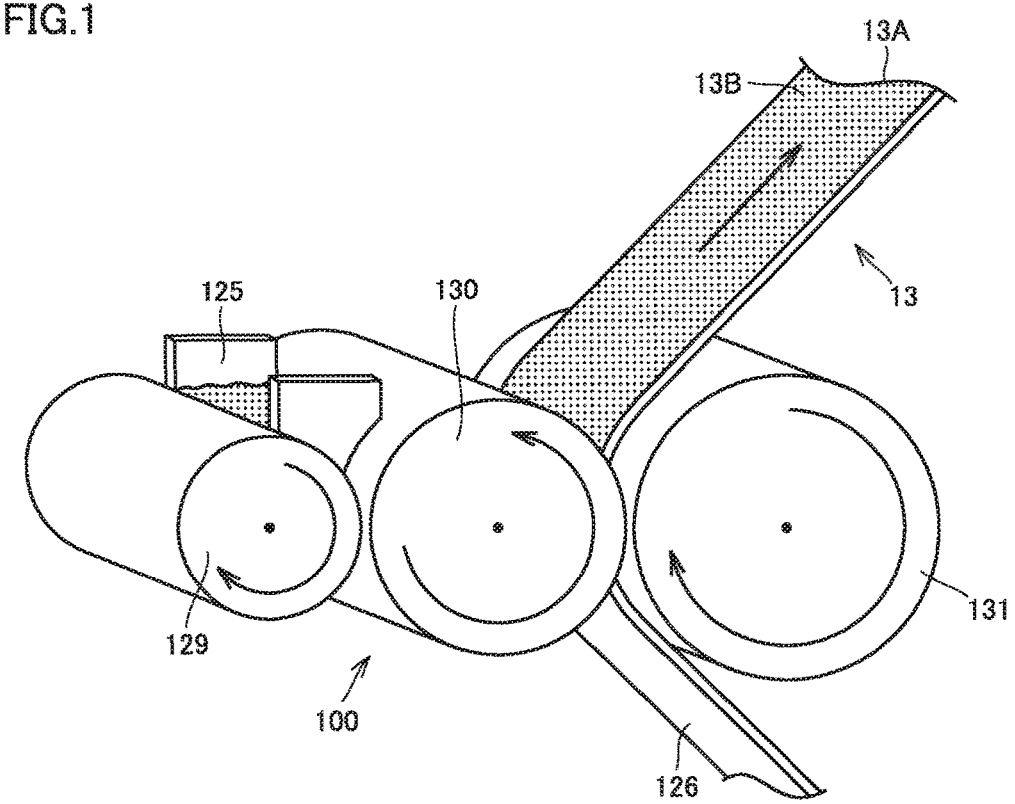
FIG. 1 is a perspective view showing a step of manufacturing an electrode plate using wet powder.

Hereinafter, embodiments in an example based on the present invention will be described with reference to the drawings. When the number, an amount or the like is mentioned in the embodiments described below, the scope of the present invention is not necessarily limited to that number, that amount or the like, unless otherwise specified. The same or corresponding parts have the same reference characters allotted, and repeated description may not be given. Combination as appropriate of features in the embodiments is originally encompassed. The drawings are not depicted in an actual size ratio, and some of them are depicted in a different ratio for ease of understanding of the structure.

[Apparatus and Method for Manufacturing Electrode]

Referring to FIG. 1, a method for manufacturing an electrode plate for use in a rolled electrode body of a secondary battery will be described below. FIG. 1 is a perspective view showing a step of manufacturing an electrode plate using wet powder.

An electrode plate 13 has an electrode core 13A and an electrode mixture layer 13B coated on the surface of electrode core 13A. This electrode mixture layer 13B is made of wet powder having a desired mixing ratio of liquid.

A manufacturing apparatus 100 used for manufacturing electrode plate 13 includes a first roll 129, a second roll 130 and a third roll 131. Provided between first roll 129 and second roll 130 is an input part 125 for input of powder to a nip between first roll 129 and second roll 130.

Used as the wet powder is powder of an electrode active material (a composite lithium oxide, etc. for a positive electrode; graphite, etc. for a negative electrode) and various additives into which a kneading solvent, such as water, has been injected as a liquid component. Wet powder having a less liquid component and a lower bulk density than an active material paste for use in a step of applying a usual electrode mixture layer can thereby be obtained.

A thin film of wet powder having a predetermined thickness is formed on the surface of second roll 130, and is transferred and applied to the surface of electrode core 13A transported to the nip between second roll 130 and third roll 131.

Electrode mixture layer 13B composed of the wet powder applied to the surface of electrode core 13A has a less liquid component than an active material paste for use in the step of applying a usual electrode mixture layer, and the drying time in a drying step after the application can be shortened.

[Apparatus and Method for Manufacturing Wet Powder]

Figure 2:
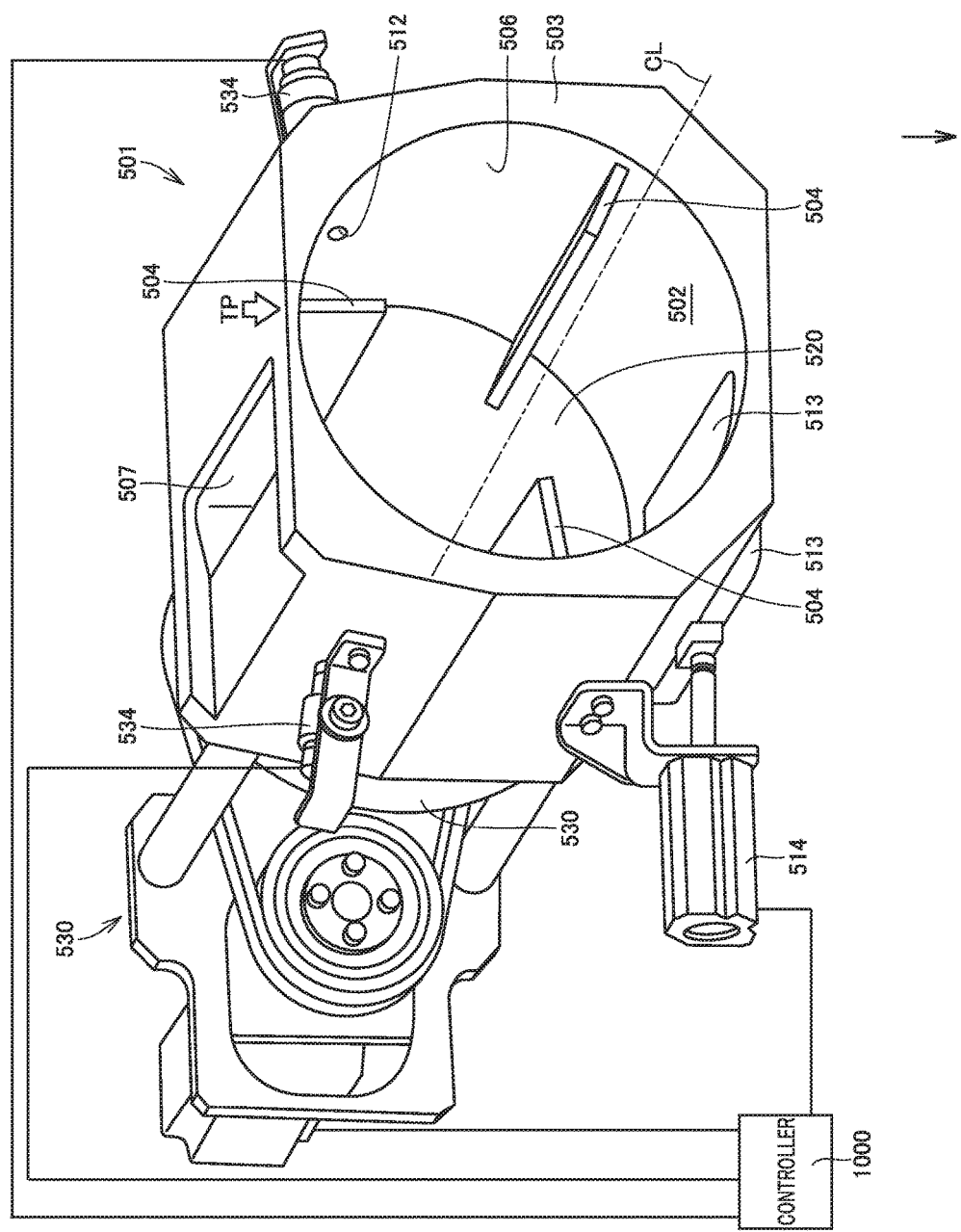
FIG. 2 is a perspective view showing an internal structure of a wet powder manufacturing apparatus according to an embodiment.
Figure 3:
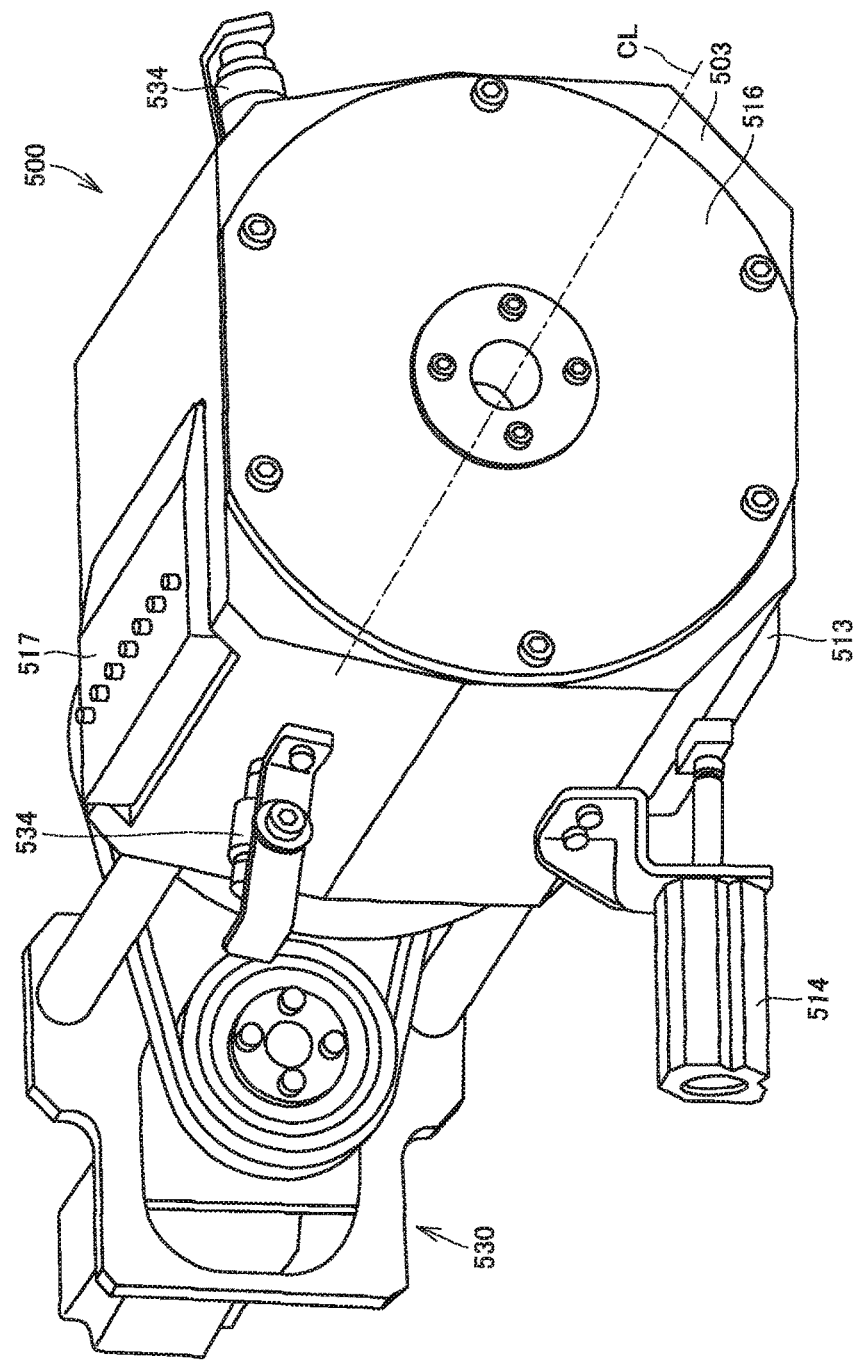
FIG. 3 is a perspective view showing an outer structure of the wet powder manufacturing apparatus according to an embodiment.
Figure 4:
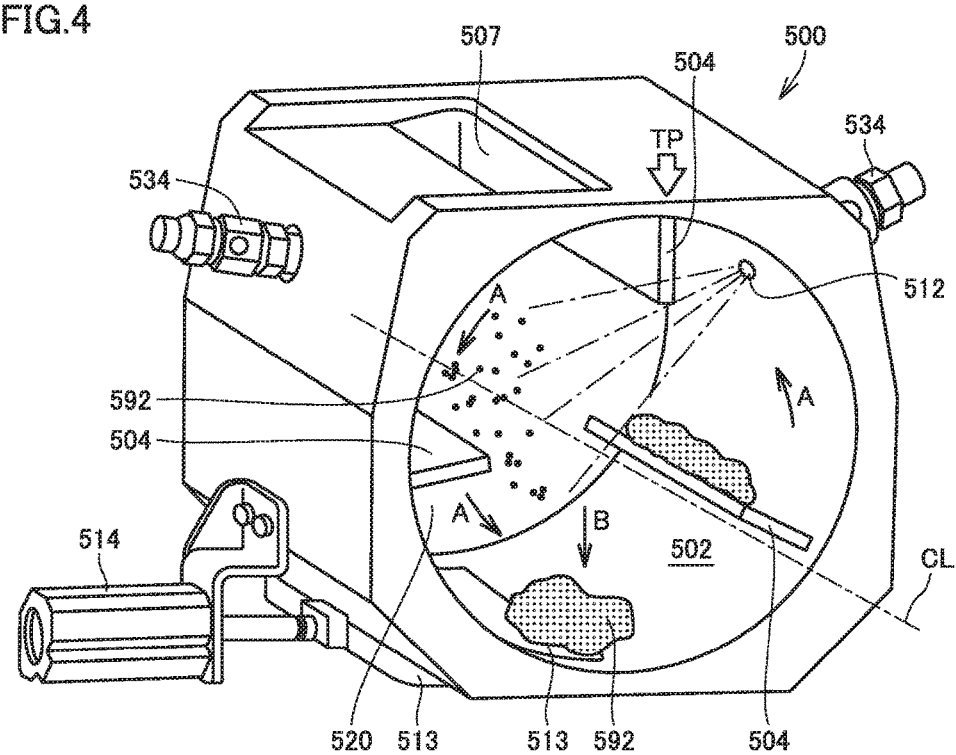
FIG. 4 illustrates a step of manufacturing wet powder using the wet powder manufacturing apparatus according to an embodiment.

Next, referring to FIGS. 2 to 4, an apparatus and a method for manufacturing wet powder according to the present embodiment will be described. FIG. 2 is a perspective view showing an internal structure of a wet powder manufacturing apparatus 500. FIG. 3 is a perspective view showing an outer structure of wet powder manufacturing apparatus 500. FIG. 4 illustrates a step of manufacturing wet powder using the wet powder manufacturing apparatus.

This wet powder manufacturing apparatus 500 includes a housing 503 having a cylindrical inner surface 506 defining a cylindrical drum inner space 502 and arranged such that a central axis CL of cylindrical inner surface 506 extends in a substantially horizontal direction. Herein, the expression that central axis CL extends in a substantially horizontal direction does not necessarily require central axis CL of cylindrical inner surface 506 to extend exactly in the horizontal direction, but includes a state where cylindrical inner surface 506 is arranged such that wet powder can be dropped from stirring blades 501 rotated about central axis CL as will be described later.

Provided at the upper part of housing 503 is an inlet 507 for input of powder into drum inner space 502. As shown in FIG. 3, when manufacturing wet powder, inlet 507 is closed by a top cover 517, and drum inner space 502 is closed by a front cover 516.

A plurality of stirring blades 504 are provided inside drum inner space 502 in housing 503. Stirring blades 504 are rotated about the central axis of drum inner space 502. Stirring blades 504 each have one end fixed to a rotary plate 520 so as to move along cylindrical inner surface 506 of drum inner space 502 with the rotation.

Stirring blades 504 are implemented by a plurality of flat elongated members arranged along cylindrical inner surface 506 in parallel to the direction of central axis CL of drum inner space 502. In the present embodiment, stirring blades 504 are made of a stainless plate material, and have a length of about 300 mm, a width of about 30 mm, and a thickness of about 5 mm, for example. Although the present embodiment illustrates that three stirring blades 504 are adopted at a pitch of 120° on cylindrical inner surface 506, the number of stirring blades 504 is selected as appropriate depending on the capacity of manufacturing wet powder requested of wet powder manufacturing apparatus 500.

Rotary plate 520 is coupled to a rotational driving device 530 for rotationally driving this rotary plate 520. Rotational control by rotational driving device 530 is executed by a controller 1000. The rotational control by rotational driving device 530 will be described in detail in the following examples.

Provided on cylindrical inner surface 506 are spray nozzles 512 for spraying liquid and injection devices 534 coupled to spray nozzles 512, as a liquid diffusing device for injecting a liquid component into drum inner space 2. Control for liquid spraying by injection devices 534 is also executed by controller 1000. In the present embodiment, spray nozzles 512 are provided at the positions of about −45° and 45° in a clockwise direction assuming the position of top TP relative to central axis CL as 0°. The number and position of spray nozzles 512 are selected as appropriate, and are not limited to those in this embodiment.

Provided at the bottom of cylindrical inner surface 506 is an opening/closing door 513 for discharging manufactured wet powder out of drum inner space 502. Opening/closing door 513 is driven by an opening/closing mechanism 514, and opening/closing is controlled. Control for opening/closing of opening/closing door 513 by opening/closing mechanism 514 is also executed by controller 1000.

Next, referring to FIG. 4, a step of manufacturing wet powder using wet powder manufacturing apparatus 500 having the above-described structure will be described.

Rotary plate 520 is rotationally driven by rotational driving device 530. Stirring blades 504 fixed to rotary plate 520 are rotationally moved in the direction of an arrow A in FIG. 4 along cylindrical inner surface 506. Powder input into drum inner space 502 through inlet 507 is thereby stirred. Liquid is sprayed from spray nozzles 512 onto the powder being dropped into drum inner space 502 through inlet 507. Accordingly, wet powder 592 is formed sequentially as a mass of water-containing powder.

Furthermore, wet powder 592 accumulated at the bottom of cylindrical inner surface 506 is scooped up by stirring blades 504 being rotated. When stirring blades 504 reach an angle at which wet powder 592 is dropped therefrom, scooped-up wet powder 592 is slid down from stirring blades 504 and is dropped downward as indicated by an arrow B. Liquid is sprayed again from spray nozzles 512 onto wet powder 592 being dropped. Wet powder 592 accumulates again at the bottom of cylindrical inner surface 506.

The range of the bottom refers to the range of more than or equal to about 135° and less than or equal to about 225° in the clockwise direction assuming the position of top TP relative to central axis CL as 0°. This shall apply hereinbelow.

Control for liquid spraying by controller 1000 may be exerted by spraying liquid from spray nozzles 512 when at least any one of stirring blades 504 reaches an angle at which wet powder 592 is dropped at least from stirring blade 504, for example. By such spray control being repeated, wet powder 592 is stirred. The control for spraying liquid from spray nozzles 512 may be exerted when at least any one of stirring blades 504 is located in the upper half of cylindrical inner surface 506.

The upper half refers to the range of more than or equal to about −90° and less than or equal to about 90° in the clockwise direction assuming the position of top TP relative to central axis CL as 0°. This shall apply hereinbelow.

By thus stirring wet powder 592 in drum inner space 502 for a certain period of time, wet powder 592 having a desired mixing ratio of liquid is manufactured. Opening/closing door 513 is opened by opening/closing mechanism 514 to discharge wet powder 592 having been manufactured from drum inner space 502 to the outside.

Figure 5:
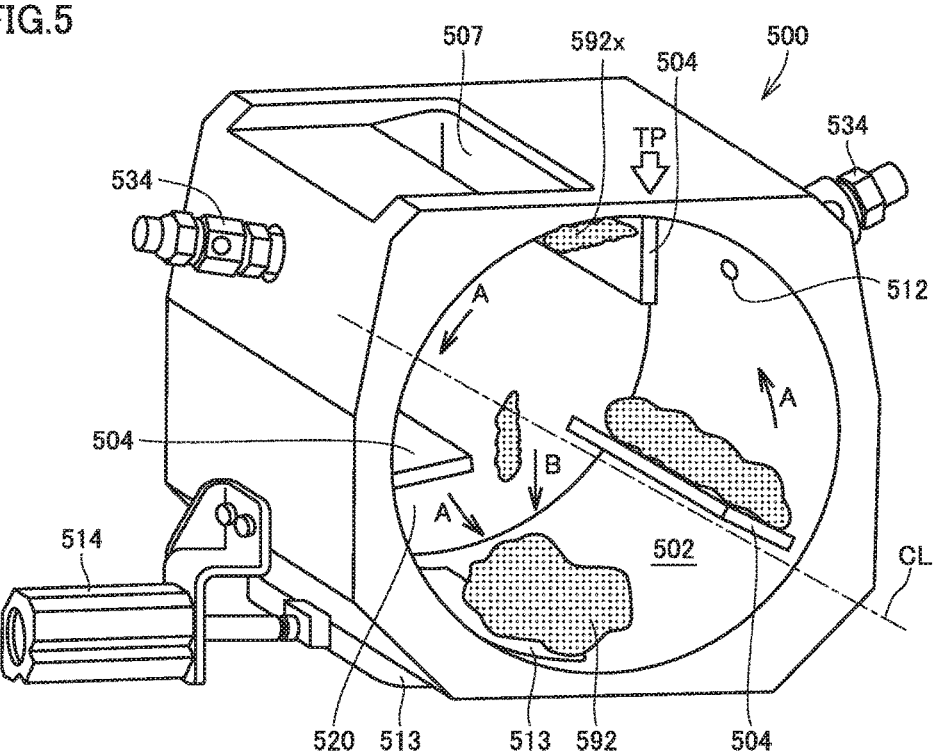
FIG. 5 is an explanatory drawing of a problem in the step of manufacturing wet powder using the wet powder manufacturing apparatus.

Referring to FIG. 5, the problem of rotational driving device 530 described above will be described. In drum inner space 502, wet powder 592 is moistened as described above. On this occasion, moistened wet powder 592 is rotated while being partly adhering to stirring blades 504 because of its adhesiveness, and will not be dropped to the bottom of cylindrical inner surface 506 (see wet powder 592x in FIG. 5). In this case, part of wet powder 592 remaining adhering cannot be discharged from drum inner space 502 to the outside, which will cause degradation in the extraction amount of wet powder 592 (deteriorated yield).

Furthermore, an additional operation for removing wet powder 592 adhering to stirring blades 504 from stirring blades 504 is also required, which also becomes a factor that causes deterioration in the efficiency of the step of manufacturing wet powder 592 using above-described wet powder manufacturing apparatus 500.

Therefore, wet powder manufacturing apparatus 500 according to the present embodiment allows wet powder 592 to be separated from stirring blades 504. As a result, wet powder 592 can be easily dropped from stirring blades 504.

For this control for separating wet powder 592 from stirring blades 504, an approach to give vibrations to stirring blades 504 to separate wet powder 592 from stirring blades 504 and an approach to utilize an inertia force to separate wet powder 592 from stirring blades 504 are conceivable. Not only either approach but also both the approaches may be carried out simultaneously. Examples 1 to 5 will be described below.

Example 1

Figure 6:
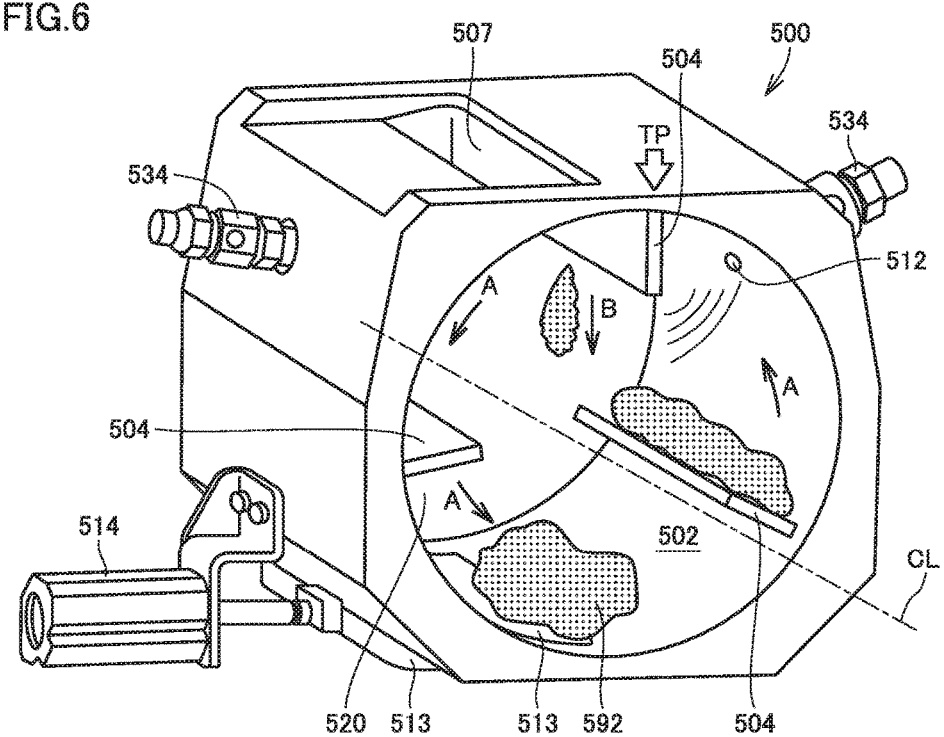
FIG. 6 illustrates how stirring blades of a wet powder manufacturing apparatus according to Example 1 are rotated.
Figure 7:
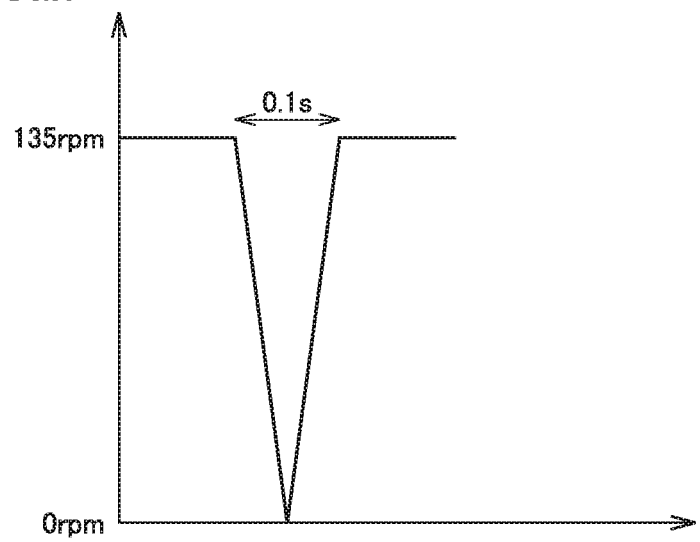
FIG. 7 illustrates rotational control over the stirring blades of the wet powder manufacturing apparatus according to Example 1.

Referring to FIGS. 6 and 7, control according to Example 1 will be described in which controller 1000 rotationally controls rotary plate 520 to produce an inertia force on wet powder 592, thereby separating wet powder 592 adhering to stirring blades 504. FIG. 6 illustrates how stirring blades 504 of wet powder manufacturing apparatus 500 are rotated. FIG. 7 illustrates the rotational control on stirring blades 504 of wet powder manufacturing apparatus 500.

Controller 1000 causes rotational driving device 530 to rotate rotary plate 520 at 135 rpm. Next, when at least any one of stirring blades 504 reaches an angle at which wet powder 592 is dropped from stirring blade 504, controller 1000 exerts control for decelerating rotary plate 520 to 0 rpm, within 0.1 second.

This control exerted by controller 1000 causes wet powder 592 adhering to stirring blades 504 to be separated from stirring blades 504 utilizing the inertia force.

As shown in FIG. 6, stirring blades 504 are supported in a cantilever manner relative to rotary plate 520. Therefore, by selecting the size, material and the like of rotary plate 520, vibrations in accordance with an inertia force can also be given to stirring blades 504 because the leading end side of stirring blades 504 tend to continue rotating when rotary plate 520 is stopped. These vibrations also allow wet powder 592 adhering to stirring blades 504 to be separated and dropped therefrom.

Wet powder 592 can thereby be collected at the bottom of cylindrical inner surface 506, and wet powder 592 can be discharged efficiently from drum inner space 502 to the outside. As a result, degradation in the extraction amount of wet powder 592 (deteriorated yield) will not occur. Furthermore, an operation of removing wet powder 592 adhering to stirring blades 504 is not required, which can increase the efficiency of the step of manufacturing wet powder 592 using wet powder manufacturing apparatus 500.

Although stirring blades 504 are shown to have a rectangular parallelepiped shape, they are not necessarily limited to this shape. Any shape that can scoop up wet powder 592, such as a shape with an inclined surface, may be adopted. The control over decelerating rotary plate 520 is shown in the drawing to be exerted when stirring blade 504 reaches top TP of a rotated position as an example of the angular position at which wet powder 592 is dropped from stirring blade 504, but this is not a limitation. For example, a range of more than or equal to about −45° and less than or equal to about 180°, preferably a range of more than or equal to about −30° and less than or equal to about 150° in the clockwise direction assuming the position of top TP relative to central axis CL as 0° is favorable. The control for 0.1 second is also merely an illustration, and an inertia force that can separate wet powder 592 from stirring blades 504 should only be generated. The speed does not need to be reduced to 0 rpm. For example, an inertia three that can separate wet powder 592 from stirring blades 504, such as a speed less than or equal to half of the speed prior to deceleration, should only be generated. This shall also apply to the following examples.

As shown in FIG. 6, wet powder 592 adhering to stirring blades 504 will be separated from stirring blades 504 because an inertia force of stopping as it is acts on wet powder 592 by exerting again the control for accelerating rotary plate 520 in the original rotation direction.

Moreover, by selecting the size, material and the like of rotary plate 520, vibrations in accordance with an inertia force can also be given to stirring blades 504 because the leading end side of stirring blades 504 tends to remain stopped when rotary plate 520 is stopped as described above. These vibrations also allow wet powder 592 adhering to stirring blades 504 to be separated and dropped therefrom. As a result, an operation effect similar to that obtained at the time of the above-described deceleration can be obtained.

Example 2

Figure 8:
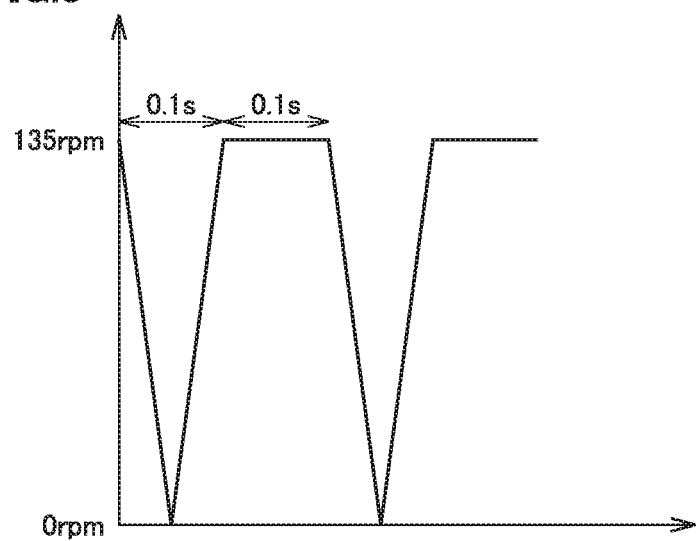
FIG. 8 illustrates rotational control over stirring blades of a wet powder manufacturing apparatus according to Example 2.

Referring to FIG. 8, control according to Example 2 will be described in which controller 1000 rotationally controls rotary plate 520 to produce an inertia force on wet powder 592, thereby separating wet powder 592 adhering to stirring blades 504. FIG. 8 illustrates the rotational control on stirring blades 540 of wet powder manufacturing apparatus 500 of this example.

In this Example 2, controller 1000 sequentially exerts control at intervals of 0.1 second in which rotary plate 520 is decelerated to stop and accelerated to be rotated again in the original rotation direction. Accordingly, while rotary plate 520 is being rotated, the effect of separating wet powder 592 from stirring blades 540 can be obtained during both of deceleration and acceleration. Also by this control method, an operation effect equivalent to or beyond that obtained in the above-described Example 1 can be obtained.

Example 3

Figure 9:
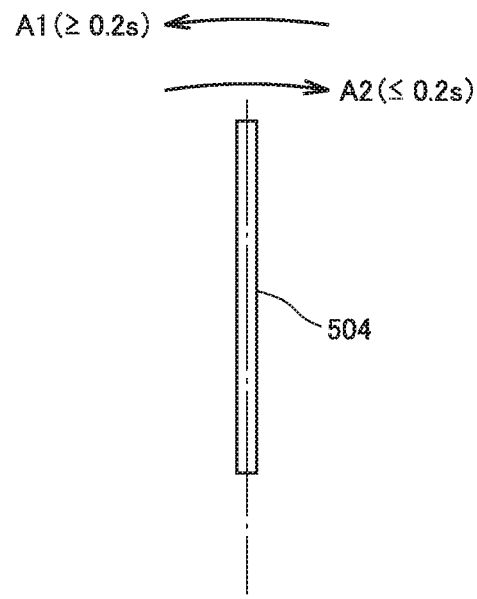
FIG. 9 illustrates rotational control over stirring blades of a wet powder manufacturing apparatus according to Example 3.

Referring to FIG. 9, control according to Example 3 will be described in which controller 1000 rotationally controls rotary plate 520 to produce an inertia force on wet powder 592, thereby separating wet powder 592 adhering to stirring blades 504. FIG. 9 illustrates the rotational control on stirring blades 540 of wet powder manufacturing apparatus 500 of this example.

In this Example 3, for example, controller 1000 exerts control in which, when stirring blades 504 reach an angle at which wet powder 592 is dropped therefrom, rotary plate 520 is continuously rotated for 0.2 second or more in a rotation direction (A1) as it is, and then rotated for 0.2 second or less in an opposite rotation direction. In the drawing, the above-described rotational control is exerted when at least any one of stirring blades 504 reaches at least top TP of the rotated position, as an example.

By this control exerted by controller 1000, the effect of separating wet powder 592 from stirring blades 540 can be obtained during both of deceleration and acceleration while rotary plate 520 is being rotated, similarly to the above-described Example 2. Also by this control method, an operation effect equivalent to or beyond that obtained in the above-described Example 2 can be obtained.

In Examples 1 to 3, when three (all) stirring blades 504 reach an angle at which wet powder 592 is dropped therefrom, controller 1000 exerts control for giving vibrations to stirring blades 504 to separate and drop wet powder 592 adhering to respective stirring blades 504 therefrom, but controller 1000 may exert control for giving vibrations to stirring blades 504 through selection when any one or two stirring blades 504 reach an angle at which wet powder 592 is dropped therefrom.

Example 4

Figure 10:
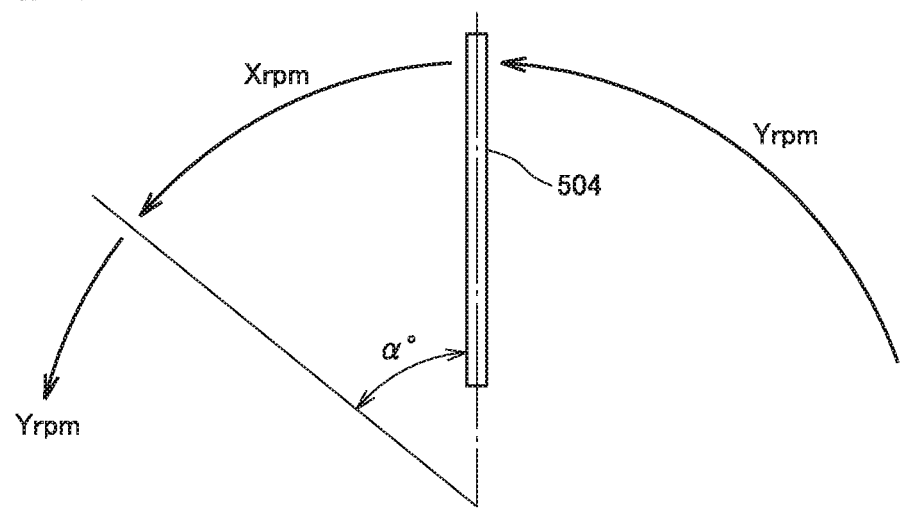
FIG. 10 illustrates rotational control over stirring blades of a wet powder manufacturing apparatus according to Example 4.

Referring to FIG. 10, control according to Example 4 will be described in which controller 1000 rotationally controls rotary plate 520 to give vibrations to stirring blades 504. FIG. 10 illustrates the rotational control on stirring blades 504 of wet powder manufacturing apparatus 500.

In this Example 4, controller 1000 exerts control in which, when stirring blade 504 reaches top TP of the rotated position, a rotating speed having been Yrpm so far is changed to a rotating speed Xrpm different from Yrpm, and then stirring blades 504 are rotated again so as to return to original Yrpm. The rotating speed different front Yrpm may be faster or slower than Yrpm. The timing of return to the original rotating speed after the change may be determined by a rotation angle α° as shown in FIG. 10 or may be determined by time.

In this example, when three (all) stirring blades 504 reach an angle at which wet powder 592 is dropped therefrom, controller 1000 exerts the above-described control for giving vibrations to stirring blades 504, thereby separating and dropping wet powder 592 adhering to respective stirring blades 504 therefrom, but controller 1000 may exert the above-described control over stirring blades 504 through selection when any one or two stirring blades 504 reach top TP of the rotated position. In the drawing, the above-described rotational control is exerted when at least any one of stirring blades 504 reaches at least top TP of the rotated position, as an example.

Also in this Example 4, an operation effect equivalent to or beyond that obtained in the above-described Example 1 can be obtained.

Example 5

Referring to FIG. 11, a case of providing a vibration applicator 600 for rotary plate 520 will be described. FIG. 11 illustrates vibration applicator 600 provided for rotary plate 520.

In this example, vibration applicator 600 is provided for rotary plate 520. Vibration control by this vibration applicator 600 is exerted by controller 1000.

In this Example 5, when stirring blades 504 reach an angle at which wet powder 592 is dropped therefrom, vibrations can be given to stirring blades 504 using vibration applicator 600 under the control of controller 1000. These vibrations allow wet powder 592 adhering to stirring blades 504 to be separated and dropped therefrom.

The direction of vibrations given to stirring blades 504 does not need to be identical to the rotation direction, but vibrations may be given in the direction opposite to the rotation direction. Vibrations may be given to stirring blades 504 at any timing not only when stirring blades 504 reach top TP of the rotated position, but also when stirring blades 504 reach a rotation angle at which wet powder 592 is dropped therefrom.

Accordingly, wet powder 592 can be collected at the bottom of cylindrical inner surface 506, and can be discharged efficiently from drum inner space 502 to the outside. As a result, degradation in the extraction amount of wet powder 592 (deteriorated yield) will not occur. Furthermore, an operation of removing wet powder 592 adhering to stirring blades 504 therefrom is not required, which can increase the efficiency of the step of manufacturing wet powder 592 using wet powder manufacturing apparatus 500.

In this example, when three (all) stirring blades 504 reach an angle at which wet powder 592 is dropped therefrom, controller 1000 exerts the above-described control over stirring blades 504 to give vibrations thereto, thereby separating and dropping wet powder 592 adhering to respective stirring blades 504 therefrom, but controller 1000 may exert the above-described control over stirring blades 504 through selection when any one or two stirring blades 504 reach top TP of the rotated position.

Another Example

Referring to FIG. 12, a structure of a liquid feeding device of a wet powder manufacturing apparatus according to another embodiment will be described. FIG. 12 illustrates a structure of a liquid feeding device of a wet powder manufacturing apparatus according to another embodiment.

The above-described embodiment describes employing spray nozzles 512 for spraying liquid and injection devices 534 coupled to spray nozzles 512 as a liquid diffusing device for injecting a liquid component into drum inner space 2. In the present embodiment, rotary plate 520 is provided with a liquid diffusing device 700.

Countless fine diffusion holes 700*h* are provided in the surface of liquid diffusing device 700 for allowing liquid contained therein to be diffused into drum inner space 2 by a centrifugal force generated by the rotation of rotary plate 520. When this liquid diffusing device is applied to each of the above-described examples, an operation effect similar to that obtained in each example can also be obtained.

Instead of spray nozzle 512, a foaming nozzle may be used. The foaming nozzle is a nozzle for blowing air into a liquid component and spraying the liquid component in a foamed state.

The above-described embodiment describes wet powder for use in an electrode plate of a secondary battery, but wet powder for use in an electrode plate of a secondary battery is not a limitation. The above-described wet powder manufacturing apparatus can also be used for other equivalent applications.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A wet powder manufacturing apparatus for manufacturing wet powder while wetting powder, the wet powder manufacturing apparatus comprising:
   a housing having a cylindrical inner surface defining a cylindrical drum inner space, the housing being arranged such that a central axis of the cylindrical inner surface extends in a substantially horizontal direction, an upper portion of the housing having an inlet for the powder and a bottom portion of the housing having an opening/closing door for the discharge of the powder;
   a plurality of stirring blades arranged to extend in the direction of the central axis along the cylindrical inner surface and provided rotatably about the central axis;
   a rotary plate configured to support each of the plurality of stirring blades at one end and to rotate the stirring blades about the central axis such that the wet powder accumulated at the bottom of the cylindrical inner surface is scooped by the stirring blades and then dropped;
   a driving device configured to impart rotation to the rotary plate of the cylindrical drum inner space;
   a liquid spray nozzle provided in the cylindrical inner surface and configured to spray liquid into the cylindrical drum inner space so as to wet the powder;
   a vibration applicator provided with the rotary plate; and
   a controller configured to control operations of the driving device and the liquid spray nozzle, wherein the controller is configured to drive the vibration applicator to vibrate the stirring blades.

2. The wet powder manufacturing apparatus according to claim 1, wherein the controller causes the driving device to rotate the rotary plate in an opposite rotation direction.

3. The wet powder manufacturing apparatus according to claim 1, wherein
   the controller causes the liquid spray nozzle to spray the liquid when at least one of the stirring blades is located in an upper half of the cylindrical inner surface.

4. A wet powder manufacturing method for manufacturing wet powder using a wet powder manufacturing apparatus for manufacturing wet powder while wetting powder, the wet powder manufacturing apparatus including:
   a housing having a cylindrical inner surface defining a cylindrical drum inner space, the housing being arranged such that a central axis of the cylindrical inner surface extends in a substantially horizontal direction, an upper portion of the housing having an inlet for the powder and a bottom portion of the housing having an opening/closing door for the discharge of the powder;

a plurality of stirring blades arranged to extend in the direction of the central axis along the cylindrical inner surface and provided rotatably about the central axis;

a rotary plate configured to support each of the plurality of stirring blades at one end and to rotate the stirring blades about the central axis such that the wet powder accumulated at the bottom of the cylindrical inner surface is scooped by the stirring blades and then dropped;

a driving device configured to impart rotation to the rotary plate of the cylindrical drum inner space;

a liquid spray nozzle provided in the cylindrical inner surface and configured to diffuse liquid into the cylindrical drum inner space so as to wet the powder;

a vibration applicator provided with the rotary plate; and a controller configured to control operations of the driving device and the liquid spray nozzle, wherein the controller is configured to drive vibration applicator to vibrate the stirring blades, the wet powder manufacturing method comprising manufacturing the wet powder as desired by repeating a step of rotating the stirring blades about the central axis to scoop up the wet powder accumulated at the bottom of the cylindrical inner surface, then dropping the wet powder from the stirring blades, and diffusing the liquid onto the dropping wet powder using the liquid spray nozzle to wet the wet powder.

5. A wet powder manufacturing apparatus for manufacturing wet powder while wetting powder, the wet powder manufacturing apparatus comprising:

a housing having a cylindrical inner surface defining a cylindrical drum inner space, the housing being arranged such that a central axis of the cylindrical inner surface extends in a substantially horizontal direction, an upper portion of the housing having an inlet for the powder and a bottom portion of the housing having an opening/closing door for the discharge of the powder;

a plurality of stirring blades arranged to extend in the direction of the central axis along the cylindrical inner surface and provided rotatably about the central axis;

a rotary plate configured to support each of the plurality of stirring blades at one end and to rotate the stirring blades about the central axis such that the wet powder accumulated at the bottom of the cylindrical inner surface is scooped by the stirring blades and then dropped;

a driving device configured to impart rotation to the rotary plate of the cylindrical drum inner space;

a liquid spray nozzle provided in the cylindrical inner surface and configured to spray liquid into the drum inner space so as to wet the powder;

a vibration applicator provided with the rotary plate; and a controller configured to control operations of the driving device and the liquid spray nozzle, wherein the controller is configured to:

drive the vibration applicator to vibrate the stirring blades, cause the driving device to reduce the rotating speed of the rotary plate at an angle at which the wet powder is dropped from the stirring blades, and cause the driving device to rotate the rotary plate in an opposite rotation direction.

6. The wet powder manufacturing apparatus according to claim 5, wherein the controller accelerates the rotary plate after reducing the rotating speed of the rotary plate.

7. The wet powder manufacturing apparatus according to claim 5, wherein the controller causes the liquid spray nozzle to spray the liquid when at least one of the stirring blades is located in an upper half of the cylindrical inner surface.

* * * * *